(12) United States Patent
Klauser et al.

(10) Patent No.: US 6,442,679 B1
(45) Date of Patent: Aug. 27, 2002

(54) APPARATUS AND METHOD FOR GUARD OUTCOME PREDICTION

(75) Inventors: Arthur Klauser, Brookline, MA (US); Keith Istvan Farkas, San Carlos, CA (US)

(73) Assignee: Compaq Computer Technologies Group, L.P., Houston, TX (US)

( * ) Notice: Subject to any disclaimer, the term of this patent is extended or adjusted under 35 U.S.C. 154(b) by 0 days.

(21) Appl. No.: 09/375,813

(22) Filed: Aug. 17, 1999

(51) Int. Cl.$^7$ ................................................. G06F 9/00
(52) U.S. Cl. ...................................... 712/218; 712/239
(58) Field of Search .............................. 712/218, 233, 712/234, 236, 239

(56) References Cited

U.S. PATENT DOCUMENTS

| | | | | |
|---|---|---|---|---|
| 5,564,118 A | * | 10/1996 | Steely | 712/240 |
| 5,758,142 A | | 5/1998 | McFarling et al. | 712/239 |
| 5,809,450 A | | 9/1998 | Chrysos et al. | 702/186 |
| 5,857,104 A | * | 1/1999 | Natarjan et al. | 712/239 |
| 5,933,628 A | * | 8/1999 | Chang | 712/233 |
| 6,009,512 A | * | 12/1999 | Christie | 712/218 |
| 6,108,774 A | * | 8/2000 | Muthusamy | 712/240 |
| 6,223,280 B1 | * | 4/2001 | Horton et al. | 712/237 |
| 6,247,122 B1 | * | 6/2001 | Henry et al. | 712/224 |
| 6,269,438 B1 | * | 7/2001 | Chang | 712/233 |
| 6,304,960 B1 | * | 10/2001 | Yeh et al. | 712/236 |
| 6,367,004 B1 | * | 4/2002 | Grochowski et al. | 712/226 |

OTHER PUBLICATIONS

"The Alpha 21264 Microprocessor," R. E. Kessler, *IEEE Micro*, Mar.–Apr. 1999, pp. 24–36.

* cited by examiner

*Primary Examiner*—Eric Coleman
(74) *Attorney, Agent, or Firm*—Pennie & Edmonds LLP

(57) ABSTRACT

Guard prediction apparatus for predicting guard outcomes for predicated instructions, each of which specifies a guard operator to be applied to a guard source to generate the guard outcome. The guard prediction apparatus includes a cache, availability logic, a selection circuit, a deduction circuit and write back circuitry. The cache stores previous predictions of guard outcomes for a set of guard sources and guard operators. The availability logic determines whether the cache includes a previous prediction that is relevant to a first guard source and a first guard operator and, if so, couples that previous prediction to the selection circuit. The selection circuit generates the final guard outcome prediction by selecting between the previous prediction, if available, and an initial prediction, if a previous prediction is not available. The deduction circuit deduces from the initial prediction of the guard outcome other consistent guard outcomes for a set of guard operators when applied to the guard source. The write back circuitry writes the initial prediction and the deduced guard outcomes into the cache for future use.

28 Claims, 9 Drawing Sheets

APPARATUS AND METHOD FOR GUARD OUTCOME PREDICTION

The present invention relates generally to a dynamically-scheduled microprocessor, and particularly to a guard outcome predictor for a dynamically-scheduled microprocessor that executes predicated instructions.

BACKGROUND OF THE INVENTION

A predicated instruction is a machine-level instruction whose operation is performed only if a specified condition is true. (For brevity, the term "instruction" will be used hereafter for "machine-level instructions".) A conditional move, CMOV, is an example of a predicated instruction. A predicated instruction includes a guard and guarded instructions. The guard includes a guard operator and at least one guard source. The guard operator is applied to the guard sources to determine whether the specified condition is true. Possible guard operators include, for example: equal-to-zero, EQ; greater-than-zero, GT; and not-equal-to-zero, NEQ. A guard source may be a constant encoded within the predicated instruction or the contents of a register whose ID is encoded within the predicated instruction. Application of the guard operator to the guard sources yields a guard outcome. When the guard outcome is TRUE then the guarded instructions are executed. On the other hand, if the guard outcome is FALSE, then execution of the guarded instructions must not affect the architectural state of the microprocessor. In other words, if the guard outcome is FALSE execution of the guarded instructions must not affect the state visible to an application program.

Execution of predicated instructions impacts the design and performance of dynamically-scheduled microprocessors, particularly those using register renaming. A brief description of dynamically-scheduled microprocessors and register renaming helps illustrate the difficulties presented by predicated instructions. A dynamically-scheduled microprocessor is one in which instructions may be issued to the functional units for execution in an order that is different from the order in which the instructions are fetched. To increase the number of instructions that may be issued in any given cycle, many dynamically-scheduled microprocessors use register renaming to eliminate write-after-write and write-after-read dependencies. Register renaming involves mapping the architectural registers named in the instructions to actual, physical, registers. Register renaming typically occurs after an instruction has been fetched.

FIG. 1 illustrates, in block diagram form, a prior dynamically-scheduled microprocessor. The microprocessor includes a data and instruction cache and a series of cascaded stages: a fetcher, mapper, dispatcher, execution pipes, and a retire unit. The fetcher fetches instructions from the memory hierarchy and decodes them to determine the operation of the instruction as well as all of the architectural registers and/or constants required for instruction execution. The order in which instructions are fetched is called the fetch order. For each fetched instruction, decoding yields zero or more architectural source registers and zero or more destination architectural registers. These two sets of architectural registers are then renamed to physical registers by the mapper. That is, for each instruction I in fetch order, the mapper maps I's source architectural registers to the physical registers that contain the corresponding latest values. Then, if instruction I names one or more destination registers, the mapper maps each of these registers to a unique and free physical register. For example, if instruction I names a single destination architectural register $L_{dx}$, the mapper will create a mapping between $L_{dx}$ and some free physical register $P_1$. This mapping will remain active until another instruction $I_2$ that names $L_{dx}$ as one of its destination registers subsequently enters the rename stage. When such an instruction occurs, the mapper creates a mapping between $L_{dx}$ and a free physical register $P_2$ and in the process, unmaps $P_1$ from $L_{dx}$. As a result of this unmapping, for all instructions subsequent to I and up to and including $I_2$ that name $L_{dx}$ as a source register, the mapper will map this source register to $P_1$. That is, $P_1$ will contain the latest value of $L_{dx}$ for these instructions. After register renaming, instructions are placed in the dispatch buffer of the dispatcher. The dispatcher dynamically selects from its buffer the next instruction to be issued to the execution pipes. The dispatcher issues instructions when their input dependencies have been resolved and when a suitable functional unit of the execution pipes is available. After the execution pipes have completed execution of an instruction, the result may be written back into a destination register, if one was allocated during register renaming. When all architectural constraints of an instruction have been satisfied, the retire unit retires, or commits, the instruction results to the architectural state of the microprocessor. If the retire unit commits results in program order, when an instruction is committed that names one or more architectural destination registers, one or more physical registers are freed. That is, assuming the retire unit commits instruction $I_2$ above, during the process it will free physical register $P_1$. Physical register $P_1$ can be freed at this point because there are no longer any instructions in the system that require the value contained in $P_1$. In general, physical registers can be freed only when their being freed will not prevent the processor from recovering and resuming execution after a mispredicted branch or a non-fatal exception. Recovery and execution resumption requires, among other things, the ability to restore the register mapping and the list of free physical registers. A number of approaches to state recovery exist.

The design and performance impact upon a dynamically-scheduled microprocessor of supporting predicated instructions arise from the additional data dependencies of predicated instructions. Predicated instructions include three sources of data dependencies, as compared to the single source of data dependency of a non-predicated instruction. The first input-dependency source, which is unique to predicated instructions, relates to the guard sources. To determine the guard outcome, a microprocessor must read the value of the guard sources and apply to it the guard operator. The second input-dependency source, which is not unique to predicated instructions, relates to the source registers named in the guarded instructions. If the guard outcome is TRUE, then the hardware performs the operations specified by the guarded instructions using the values of the sources for the guarded instructions. The reading of these sources induces an input dependency. The final input dependency relates to the destinations of the guarded instructions and is unique to predicated instructions. The general case is more easily explained using an example. If a guarded instruction I names a destination architectural register $L_{dst}$ and if the guard outcome is FALSE, those instructions preceding the predicated instruction I in fetch order and those following it must all obtain the same value if they read from $L_{dst}$, assuming that no other intervening instructions write $L_{dst}$. But, because of the use of register renaming, instructions preceding I will read a physical register $P_{old}$ while those following I will read another physical register $P_{new}$, assuming that when the renamer renames the registers for I, it unmapped $P_{old}$ when mapping $P_{new}$ to $L_{dst}$. To ensure that instructions preceding and following instruction I all obtain the same value, if the guard outcome is FALSE. $P_{old}$ must be read and its value written into $P_{new}$. The read of this value induces the third input-dependency source. It is possible to implement a more complicated register renaming mechanism that does not introduce this dependency source.

The additional sources of input data dependencies of predicated instructions affect the design and performance of a dynamically-scheduled microprocessor in two ways. First, both the data paths and the control circuitry must be designed to accommodate these dependencies. The scheduling unit must track these dependencies to determine when a predicated instruction may be issued. The processor must be designed to allow the bypassing of the value corresponding to these input dependencies to the predicated instruction. Additionally, the mapper must have sufficient bandwidth to rename the guard sources. The second way in which predicated instructions affect microprocessor performance is by limiting instruction-level parallelism. Instruction-level parallelism is limited because the scheduler cannot issue a predicated instruction until all of its input dependencies have been resolved, even though all of them will not be necessary to execute the predicated instruction. The guard sources are always necessary, as they are used to determine the guard outcome, and thus determines whether the guarded instruction should be executed. If the guard outcome is found to be TRUE when the predicated instruction is executed, the scheduler need not have taken into account the availability of the value contained in $P_{old}$ when deciding when to issue the predicated instruction to a functional unit. $P_{old}$ is not required because the previously-mapped register need not be read. On the other hand, if the guard outcome is found to be FALSE, then the scheduler need not have taken into account the availability of the source operands of the guarded instruction when deciding to issue the predicated instructions, since these values will not be needed.

Guard outcome prediction could alleviate some of the issues associated with execution of predicated instructions. Guard outcome prediction would simplify the design of microprocessor data paths and control circuitry by reducing the number of data dependencies that must be tracked. Additionally, guard outcome prediction would increase instruction-level parallelism by allowing instructions to be scheduled at the time all of the data input sources predicted to be necessary were available, rather than waiting for all three of the data input sources of a predicated instruction to become available. Any guard outcome prediction scheme would have to check and account for guard outcome mispredictions.

A body of work addresses the related fields of branch prediction and value prediction. Branch prediction deals with predicting the direction of a conditional branch in an early pipe stage and executing instructions only along the predicted control-flow. Branch prediction permits microprocessor execution to continue while the outcome of a condition is determined. Branch prediction is essential to the performance of superscalar and deeply pipelined microprocessors. Branch prediction also requires checking and accounting for misprediction, which the relevant art addresses. FIG. 2 illustrates a prior branch predictor, which is described in U.S. Pat. No. 5,758,142 to McFarling et al. entitled "Trainable Apparatus for Predicting Instruction Outcomes in Pipelined Microprocessors." Value prediction reduces the issue time of instructions by predicting their input values. Like branch prediction, value prediction also requires checking and accounting for misprediction.

Guard outcome prediction, while similar to branch prediction, differs from it in at least four significant ways. First, guard prediction uses prediction to determine data flow, rather than control flow as in branch prediction. Guard prediction predicts the source of a value to be stored in the destination register named by the guarded instruction. In contrast, branch prediction predicts which instruction should be executed next. Second, as compared to branch prediction, guard outcome prediction can take more time without a performance penalty. Branch prediction is typically accomplished in a single cycle to allow predicted-taken branches to update the fetch address for the immediately following cycle. In contrast, guard outcome prediction can take several pipeline stages to produce its results without performance penalty. Guard outcome prediction can start at the time when instructions are fetched and wait to produce a prediction until the time register remapping is performed for the relevant predicated instruction, which is typically several cycles after the instruction is fetched. Third, as compared to branch prediction, guard outcome prediction requires higher prediction bandwidth. In non-predicated code, typically only a single branch prediction will be required for several instructions. With predicated code, every instruction may be decorated with a guard; i.e., there may be as high as a one-to-one correspondence between instructions and required predictions. Finally, guard outcome prediction rewards correlation of guard outcome predictions. With predicated instructions it is not infrequently the case that multiple instructions may be decorated with identical, or closely related, guards. Correlation of identical and/or closely related guards increases the likelihood of correctly predicting guard outcomes, and hence, of improving an application's performance.

Thus, a need exists for a guard outcome predictor to simplify the design, and speed-up the execution, of a dynamically-scheduled microprocessor executing predicated instructions.

SUMMARY OF THE INVENTION

The guard prediction apparatus of the present invention predicts guard outcomes for predicated instructions, each of which specifies a guard operator to be applied to a guard source to generate the guard outcome. Briefly described, the guard prediction apparatus of the present invention includes a cache, availability logic, a selection circuit, a deduction circuit and write back circuitry. The cache stores previous predictions of guard outcomes for a set of guard sources and guard operators. The availability logic determines whether the cache includes a previous prediction that is relevant to a first guard source and first guard operator and, if so, couples that previous prediction to the selection circuit. The selection circuit generates the final guard outcome prediction by selecting between the previous prediction, if available, and an initial prediction, if a previous prediction is not available. Additionally, the guard prediction apparatus includes the deduction circuit, which deduces from the initial prediction of the guard outcome other consistent guard outcomes for a set of guard operators when applied to the guard source. The write back circuitry writes the initial prediction and the deduced guard outcomes into the cache for future use.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 3:
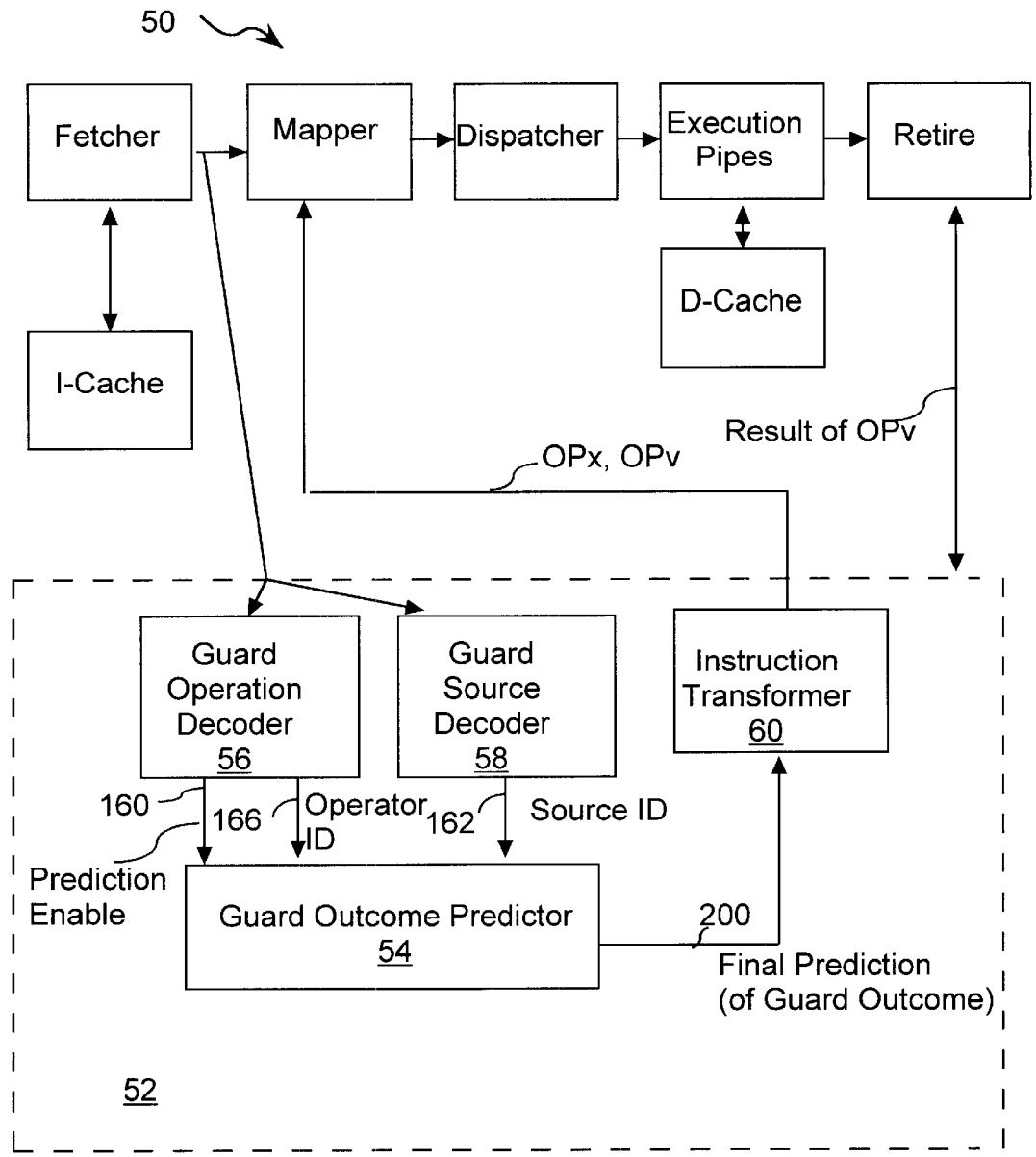
FIG. 3 is a block diagram of a dynamically-scheduled microprocessor including a guard outcome predictor.

FIG. 3 illustrates, in block diagram form, a dynamically-scheduled Microprocessor 50. Unlike prior dynamically-scheduled microprocessors, Microprocessor 50 incorporates Predicated Instruction Transformer 52. Predicated Instruction Transformer 52 reduces the design and performance impacts of predicated instructions by taking predicated instructions from the Fetcher and transforming them into non-predicated instructions prior to insertion into the Dispatcher. Guard Outcome Predictor 54 enables this transformation by predicting guard outcomes. Guard Outcome Predictor 54 will be described in more detail with respect to FIGS. 5–9.

A. Predicated Instruction Execution

By transforming predicated instructions into non-predicated instructions Predicated Instruction Transformer reduces the impact on Microprocessor 50 of predicated instruction execution. First, predicated instruction transformation reduces the data input dependencies that must be accommodated by the control circuitry and data path of Microprocessor 50. Second, predicated instruction transformation increases the possible level of instruction-parallelism because the transformed instructions can be scheduled as soon as the data input dependencies associated with the predicted guard outcome are available, as compared to when all of the data input dependencies of the predicated instruction become available. To reap the rewards offered by Predicated Instruction Transformer 52, Microprocessor 50 must implement state restoration to respond to misprediction of guard outcomes, which leads to incorrect execution of guarded instructions.

Figure 4:
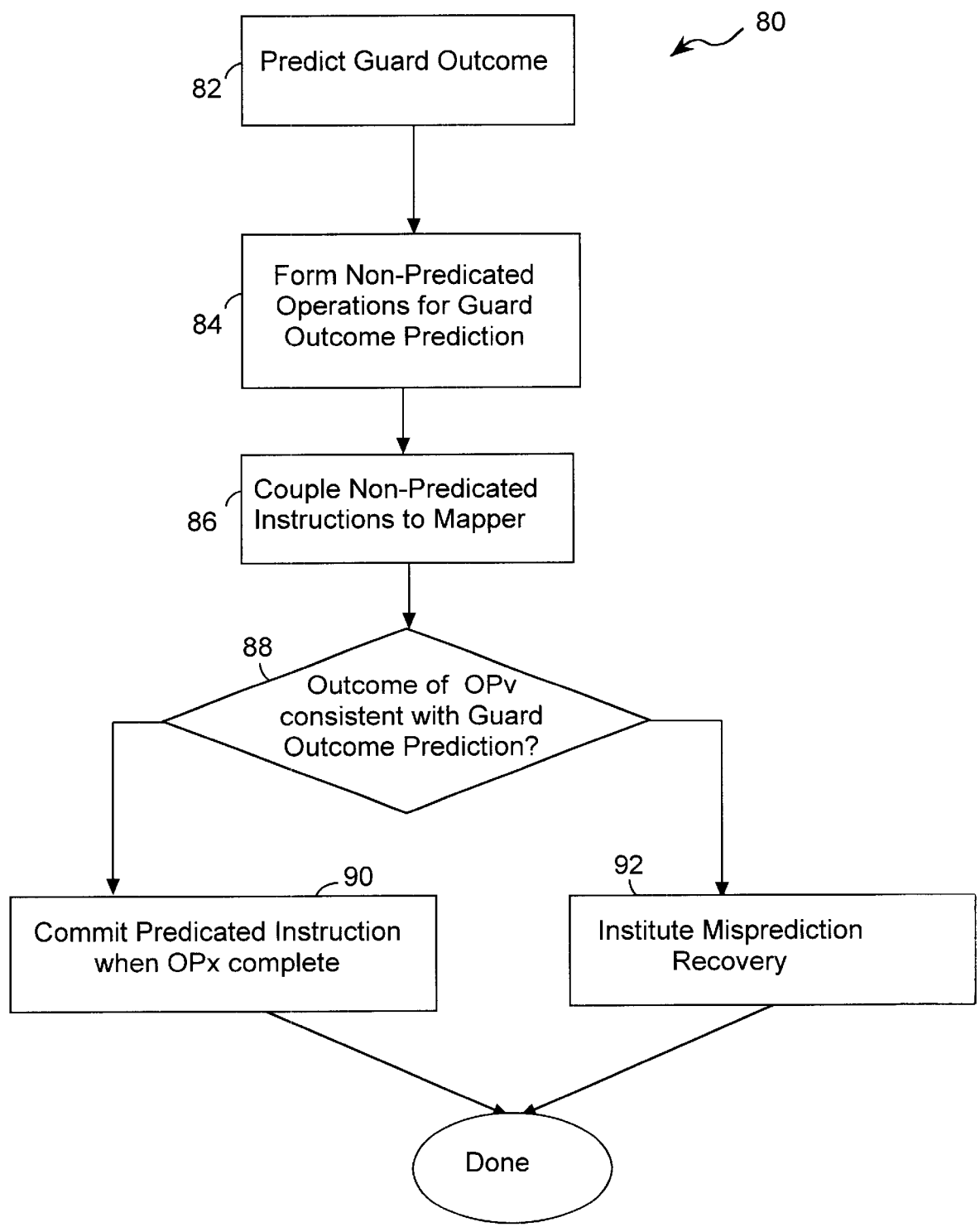
FIG. 4 is a flow diagram of a process of transforming predicated instructions into non-predicated instructions using the guard outcome predictor.

FIG. 4 illustrates the process 80 implemented by Microprocessor 50 to transform predicated instructions into non-predicated instructions. Fetcher responds to a predicated instruction by coupling it to the Predicated Instruction Transformer 52. During step 82 Predicated Instruction Transformer 52 decodes the predicated instruction to determine the guard source and guard operator and uses them to make a guard outcome prediction using Guard Outcome Predictor 54 (illustrated in FIG. 3). Given this guard outcome prediction, in step 84 Instruction Transformer 60 (illustrated in FIG. 3) transforms the predicated instruction into two non-predicated instructions, each of which is data and control independent. One of the non-predicated instructions is a guard verification operation, denoted $OP_V$, which will compute the guard outcome given the guard operator and the guard source. The other non-predicated instruction generated during step 84 is a guarded instruction operation, denoted $OP_x$. The guarded instruction operation performs the actions indicated by the guarded instruction of the predicated instruction under the assumption that the guard outcome prediction is correct. Predicated Instruction Transformer 52 couples the two non-predicated instructions to the Mapper in step 86. Upon completion of the guard verification operation, during step 88, the Execution Pipes compare the results of that operation to the associated predicted guard outcome. If the result of the guard verification operation is consistent with its associated guard outcome prediction, then process 80 branches to step 90 from step 88. During step 90, in response to completion of the guarded instruction operation, the Retire Unit commits the associated predicated instruction, completing its execution. On the other hand, if it is determined during step 88 that the result of the guard verification operation is inconsistent with the associated guard outcome prediction, then the process advances to step 92 from step 88. During step 92 Microprocessor 50 institutes state recovery to recover its architectural state prior to the insertion of the two non-predicated instructions into the Dispatcher.

Note that while FIG. 4 implies that the guard verification operation may complete before its associated guarded instruction operation, this need not be the case. Regardless of the order in which the guard verification operation and guarded instruction operation are completed by the Execution Pipes, the predicated instruction associated with the pair of non-predicated instructions will not be retired until the guard verification is completed and is found to be consistent with the associated guard outcome prediction.

B. The Predicated Instruction Transformer

Referring again to FIG. 3, Predicated Instruction Transformer 52 includes Guard Outcome Predictor 54, Guard Operation Decoder 56, Guard Source Decoder 58 and Instruction Transformer 60. Guard Operation Decoder 56 determines from the predicated instruction the identity of the guard operator to be applied to determine the guard outcome. Guard Operation Decoder 56 then couples that information to Guard Outcome Predictor 54, represented via the Operator ID signal on line 166. In parallel with Guard Operation Decoder 56, Guard Source Decoder 58 examines the predicated instruction to identify the guard source to which the guard operator is to be applied. Guard Source Decoder 58 then couples the guard source identifier to the Guard Outcome Predictor 54, represented via the Source ID signal on line 162.

In response to receipt of a guard source identifier and a guard operator, Guard Outcome Predictor 54 searches for a previous guard outcome prediction that is relevant to the present guard source. If a relevant previous guard outcome prediction is found, Guard Outcome Predictor 54 provides it to Instruction Transformer 60. On the other hand, if Guard Outcome Predictor 54 can find no previous prediction relevant to the identified guard source then an initial prediction is made and that is provided to Instruction Transformer 60. Additionally, in response to this initial prediction, Guard Outcome Predictor 54 deduces as many related predictions as possible for the identified guard source and saves these predictions for future use. This practice also allows Guard Outcome Predictor 54 to make future predictions for the same guard source that are consistent with the prediction it just made. Correlation of identical and/or closely related guards increases the likelihood of correctly predicting guard outcomes, and hence, of improving an application's performance.

Instruction Transformer 60 receives the predicated instruction and the predicted guard outcome, which is represented by the Final Prediction signal on line 200. Given these, Instruction Transformer 60 generates two non-predicated instructions, the guard verification operation, $OP_v$, and the guarded instruction operation $OP_x$. The guard verification operation will be an instruction to apply the guard operator to the guard source, regardless of what the predicted guard outcome is. If the guard outcome prediction for a predicated instruction is FALSE, then the guarded instruction operation will be an instruction to do nothing, a NOP. On the other hand, if the guard outcome prediction is TRUE, then the guarded instruction operation will be the guarded instruction.

C. Overview of the Guard Outcome Predictor

Figure 5:
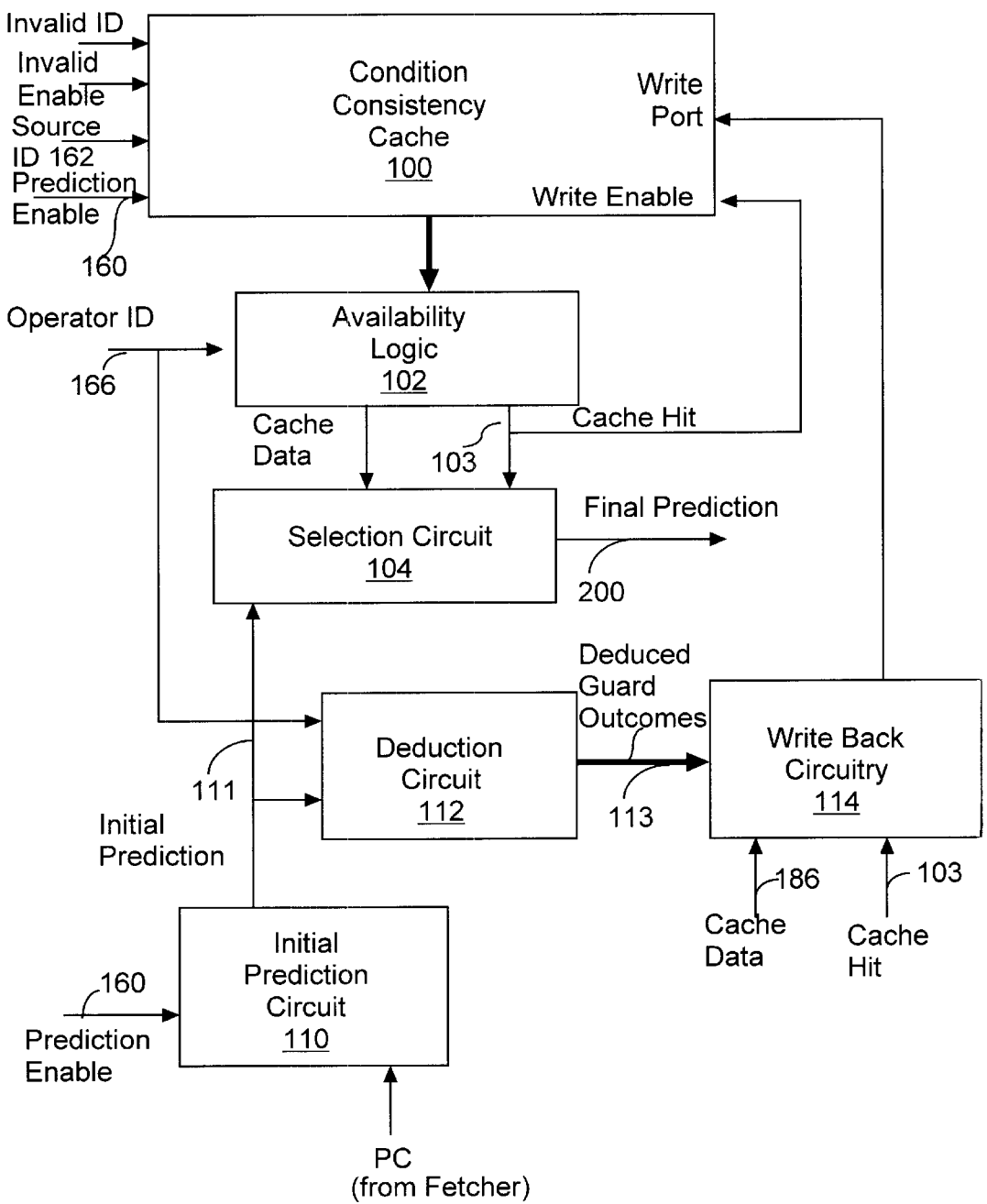
FIG. 5 is a block diagram of the guard outcome predictor.
Figure 6:
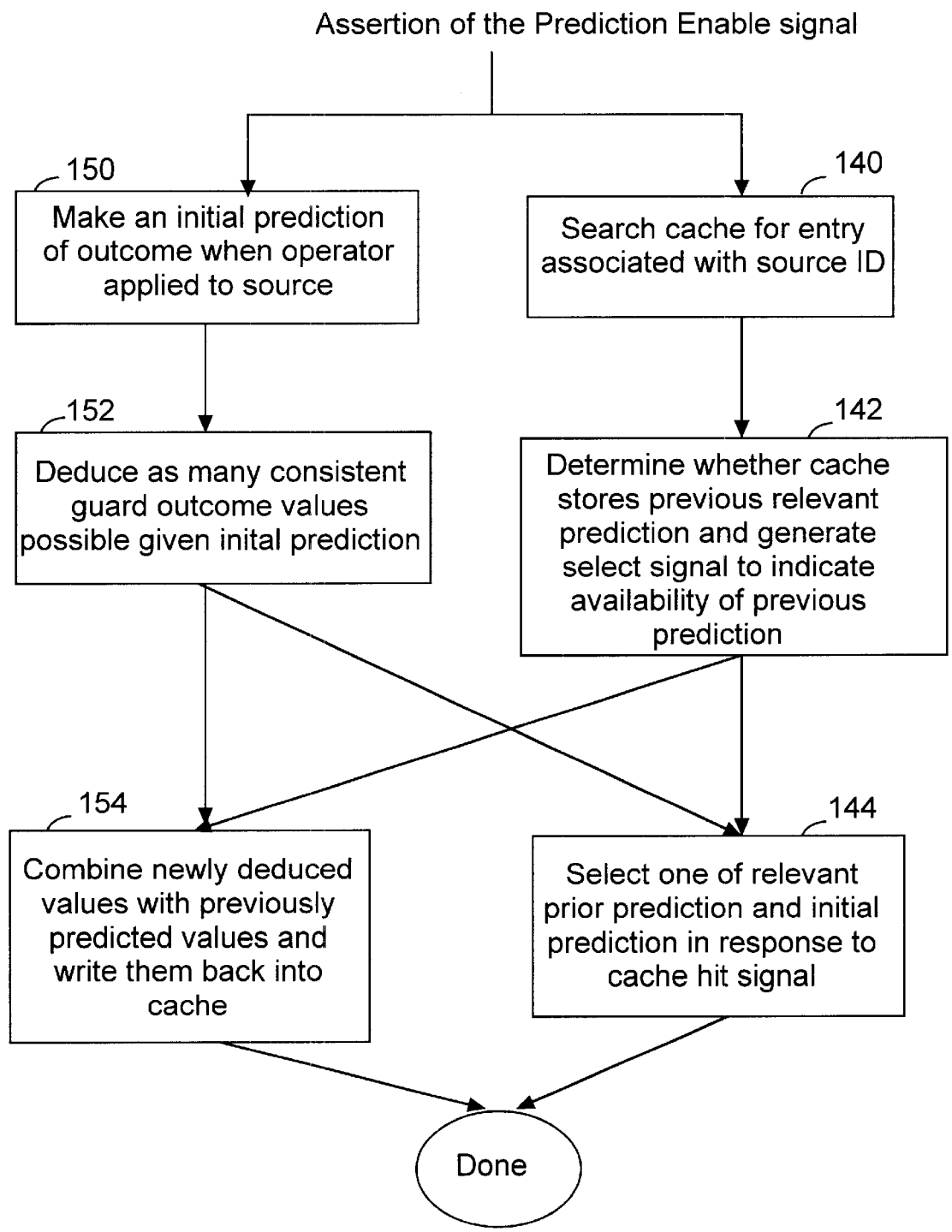
FIG. 6 is a flow diagram illustrating how the guard outcome predictor predicts guard outcomes.

FIG. 5 illustrates, in block diagram form, Guard Outcome Predictor 54, which includes Condition Consistency Cache 100, Availability Logic 102, Selection Circuit 104, Initial Prediction Circuit 110, Deduction Circuit 112, and Write Back Circuitry 114. FIG. 6 illustrates, in flow diagram form, the tasks performed by the functional blocks of Guard Outcome Predictor 54 and the interaction between them. Guard Outcome Predictor 54 performs two sets of inter-related tasks, both initiated by assertion of the Prediction Enable signal on line 160. Both Initial Prediction Circuit 110 and Condition Consistency Cache 100 respond to assertion of the Prediction Enable signal. Their responses set off two chains of events, which finally intersect with another. Consider first the chain of events that begins with the Condition Consistency Cache 100. During step 140 of FIG. 6, Condition Consistency Cache 100 (shown in FIG. 5) uses the Source ID signal on line 162 to retrieve the entry for the identified guard source. This entry represents previous guard outcome predictions made for the identified guard source, on a guard operator by guard operator basis. Condition Consistency Cache 100 passes the entry to Availability Logic 102. During step 142 of FIG. 6, Availability Logic 102 uses the Operator ID signal on line 166 to determine whether the previous guard outcome predictions for the identified guard source include one relevant to the identified guard operator. In other words, Availability Logic 102 determines whether there was a cache hit. If there is a relevant prediction, then Availability Logic 102 asserts the Cache Hit signal on line 103. Selection Circuit 104 of FIG. 5 selects between the predictions received from Availability Logic 102 and Initial Prediction Circuit 110 based upon the state of the Cache Hit signal, as illustrated in step 144 of FIG. 6. Assertion of the Cache Hit signal assures that the output of Guard Outcome Predictor 54 will be the prediction retrieved from Condition Consistency Cache 100.

The other chain of events initiated by the assertion of the Prediction Enable signal begins with Initial Prediction Circuit 110, illustrated in FIG. 5. Using the PC signal, representative of the program count, during step 150 of FIG. 6 Initial Prediction Circuit 110 makes an initial prediction of the guard outcome, which it communicates to Selection Circuit 104 and Deduction Circuit 112 via the Initial Prediction signal on line 111. During step 152 of FIG. 6, Deduction Circuit 112 makes as many consistent guard outcome predictions as possible given the initial prediction and the set of guard operators. For example, if the set of Guard Operators is: EQ, NEQ, GT, NGT (not greater than), LT, NLT (not less than), BS (bit set), and BC (bit clear), the identified guard operator is BS and the initial prediction of the guard outcome is TRUE, then Deduction Circuit 112 can reasonably deduce that the guard outcome for the same source and the EQ operator should be FALSE. However, given the same initial prediction for the same source and the operator, no reasonable outcome deduction can be made for the LT and GT operators. By deducing additional consistent guard outcomes for the same guard source, Deduction Circuit 112 increases the benefit derived from a correct guard outcome prediction. Deduction Circuit 112 couples these deduced guard outcomes, along with the initial prediction, via lines 113 to Write Back Circuitry 114 of FIG. 5. During step 154 of FIG. 6 Write Back Circuitry 114 selectively writes newly deduced guard outcomes back into Condition Consistency Cache 100. Write Back Circuitry 114 writes back only those deduced guard outcomes associated with guard operators for which Condition Consistency Cache 100 does not yet store a valid guard outcome. In other words, a guard outcome for a guard operator is written only if there is a cache miss for that operator.

In this manner Guard Outcome Predictor 54 continues to make consistent guard outcome predictions for a guard source until events indicate that a guard outcome prediction for that guard source was incorrect. In response to such information, from the Fetcher Condition Consistency Cache 100 invalidates the entry associated with that guard source. Consequently, the next time a guard outcome prediction is needed for that guard source the guard outcome prediction will be taken from Initial Prediction Circuit 110, rather than from Condition Consistency Cache 100.

D. A First Guard Outcome Predictor Embodiment

Figure 1:
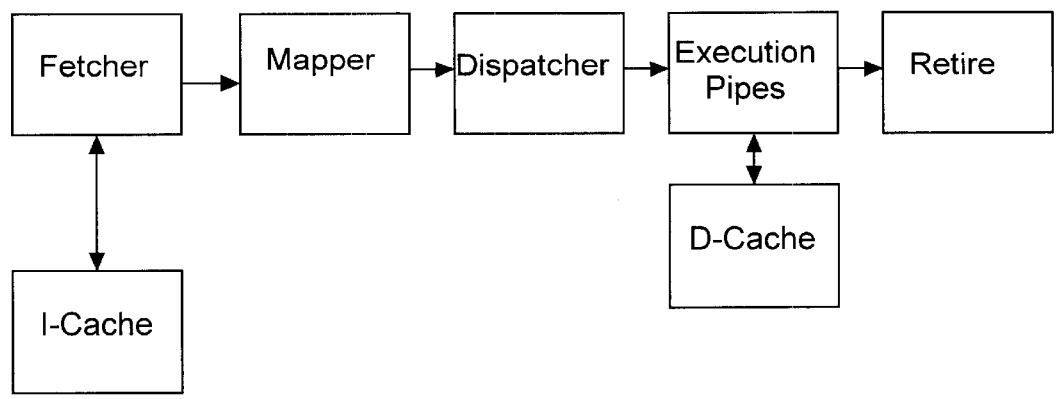
FIG. 1 is a block diagram of a prior art dynamically-scheduled microprocessor.
Figure 2:
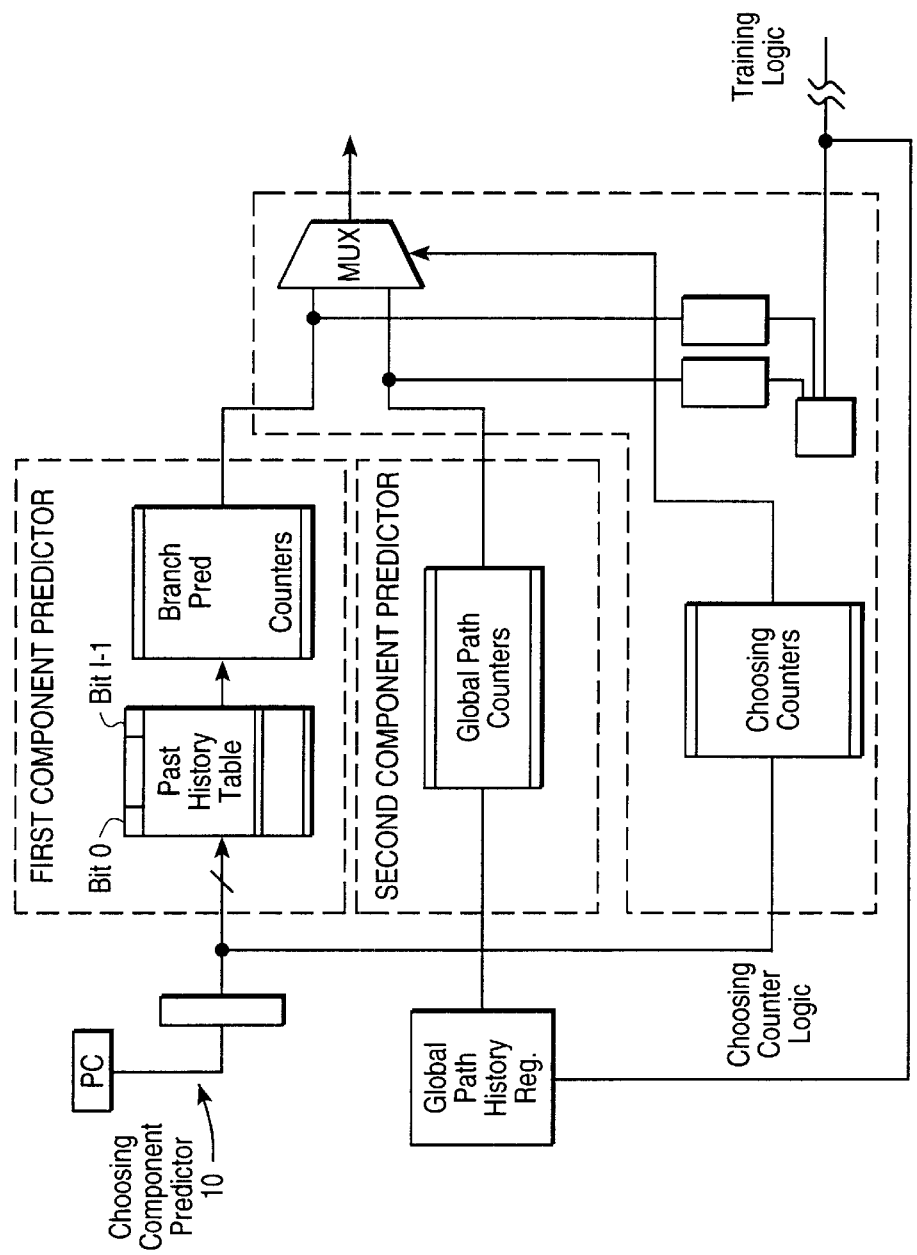
FIG. 2 is a block diagram of a prior art branch predictor.
Figure 7:
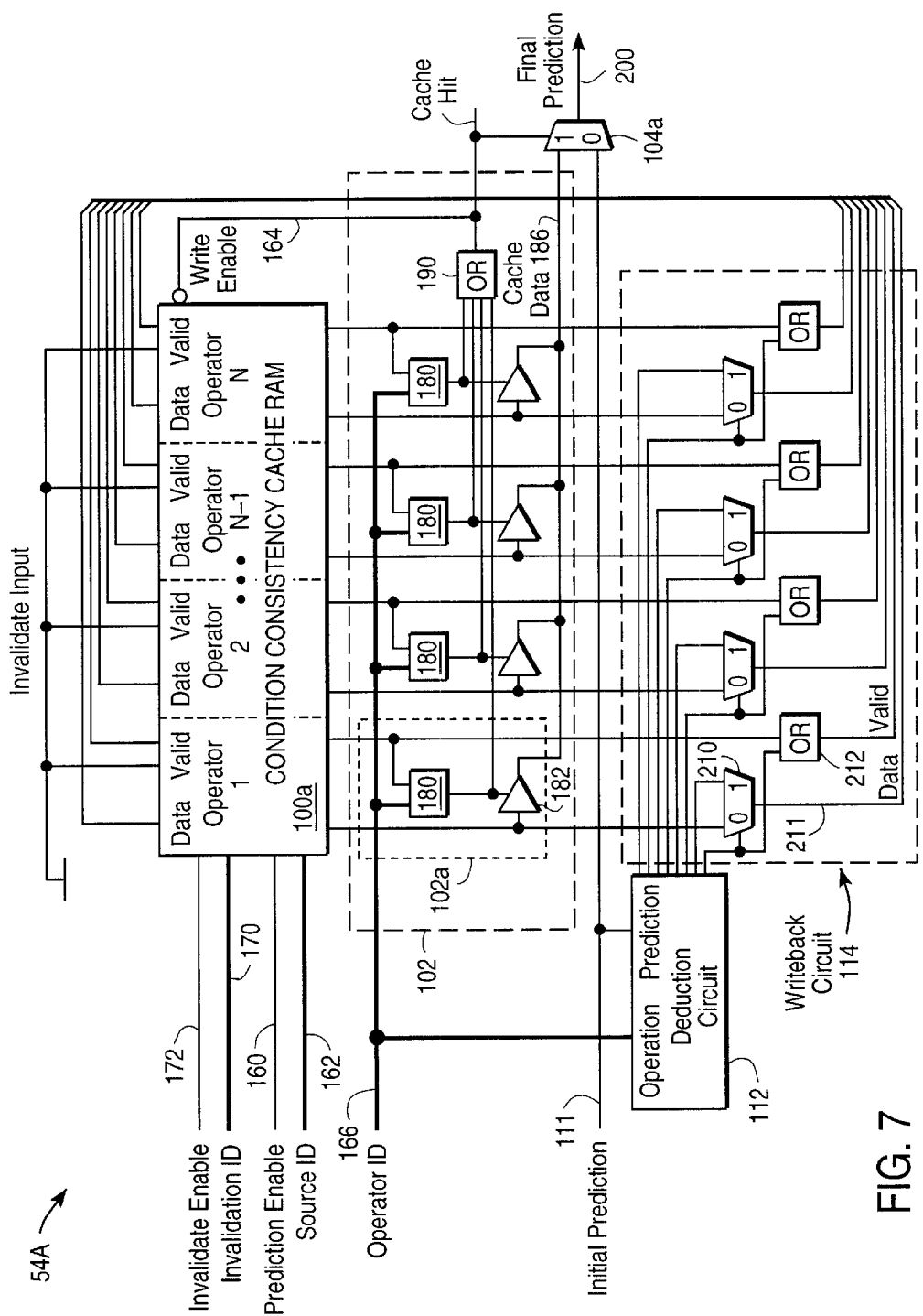
FIG. 7 is a detailed block diagram of a first embodiment of a guard outcome predictor.

FIG. 7 illustrates a first embodiment of Guard Outcome Predictor 54A. Omitted from FIG. 7, Initial Prediction Circuit 110 may be realized using the branch prediction circuit illustrated in FIG. 2. The Guard Outcome Predictor 54A of FIG. 7 stores prediction data for each guard operator of the set of guard operators. A more compact representation of guard outcome predictions is possible and an embodiment based upon this compact representation will be discussed later with respect to FIG. 9.

The primary, but not sole, impact of storing data for each guard operator is upon Condition Consistency Cache 100, which stores previous guard outcome predictions. Condition Consistency Cache 100 is realized as a random access memory device (RAM) 100a, preferably organized as a table storing an entry for each of a multiplicity of guard sources. The number of guard sources for which information is to be stored is a design choice. For each guard source entry Condition Consistency Cache RAM 100a stores a data and valid bit for each guard operator of the set of guard operators. The data bit indicates the predicted value of the guard outcome when the guard operator is applied to the guard source and the valid bit indicates the validity of the data bit. The associated valid bit is set to indicate validity whenever a prediction is made for a data bit. All valid bits associated with a guard source are cleared to indicate the invalidity of their associated data bits whenever the Fetcher retrieves an instruction that overwrites that guard source. The Fetcher invalidates an entry by identifying the guard source via the Invalidation ID signal on line 170 while asserting the Invalidate Enable signal on line 172.

Prediction data is read out of Condition Consistency Cache RAM 100a in response to assertion of the Prediction Enable signal on line 160. The set of data and valid bits for the guard source identified by Source ID signal on line 162 are coupled to Availability Logic 102. Prediction data for a guard source is written into Condition Consistency Cache RAM 100a when a cache miss for that guard source occurs.

Availability Logic 102 detects the cache miss and, in response, asserts its Write Enable signal on line 164.

As discussed previously, Availability Logic 102 determines whether or not Condition Consistency Cache 100 stores a relevant prior guard outcome prediction. Availability Logic 102 makes this determination on a guard operator by guard operator basis. Consequently, Availability Logic 102 includes one Availability Circuit 102a for each guard operator of the set of guard operators. Each Availability Circuit 102a includes a Decoder 180 and Buffer 182. Decoder 180 controls Buffer 182, allowing Buffer 182 to drive line 186 only when there is a cache hit. Decoders 180 are designed such that only one of the Availability Circuits 102a tied to line 186 drives it. Decoder 180 enables its associated Buffer 182 when a cache hit is detected. Decoder 180 detects a cache hit when the data for its associated guard operator is valid, as indicated by the state of the valid bit, and when the Decoder's associated guard operator is the one identified by the Operator ID signal on lines 166. The cache hit signal output by each Availability Circuit 102a are coupled to Logical OR 190, which generates the Cache Hit signal on line 164 that controls Selection Circuit 104a. If any Availability Circuit 102a indicates a hit, then Logical OR 190 asserts the Cache Hit signal on line 164, ensuring that the data retrieved from Condition Consistency Cache 100 will be output as the final prediction of the guard outcome. On the other hand, if none of the Availability Circuits 102a indicates a hit, then Logical OR deasserts the Cache Hit signal, causing the prediction from Initial Prediction Circuit 110 to be output as the Final Prediction on line 200. The low logic level out of Logical OR 190 in response to a cache miss also enables new data to be written into Condition Consistency Cache RAM 100a because the signal is coupled to its write enable pin.

Selection Circuit 104 is realized as a multiplexer 104a. Cache data is coupled to Selection Circuit 104a on line 186 and the Initial Prediction signal is coupled to Selection Circuit 104a on line 111. The Cache Hit signal on line 164 determines which of these two inputs is output on line 200 as the Final Prediction signal.

Figure 8:
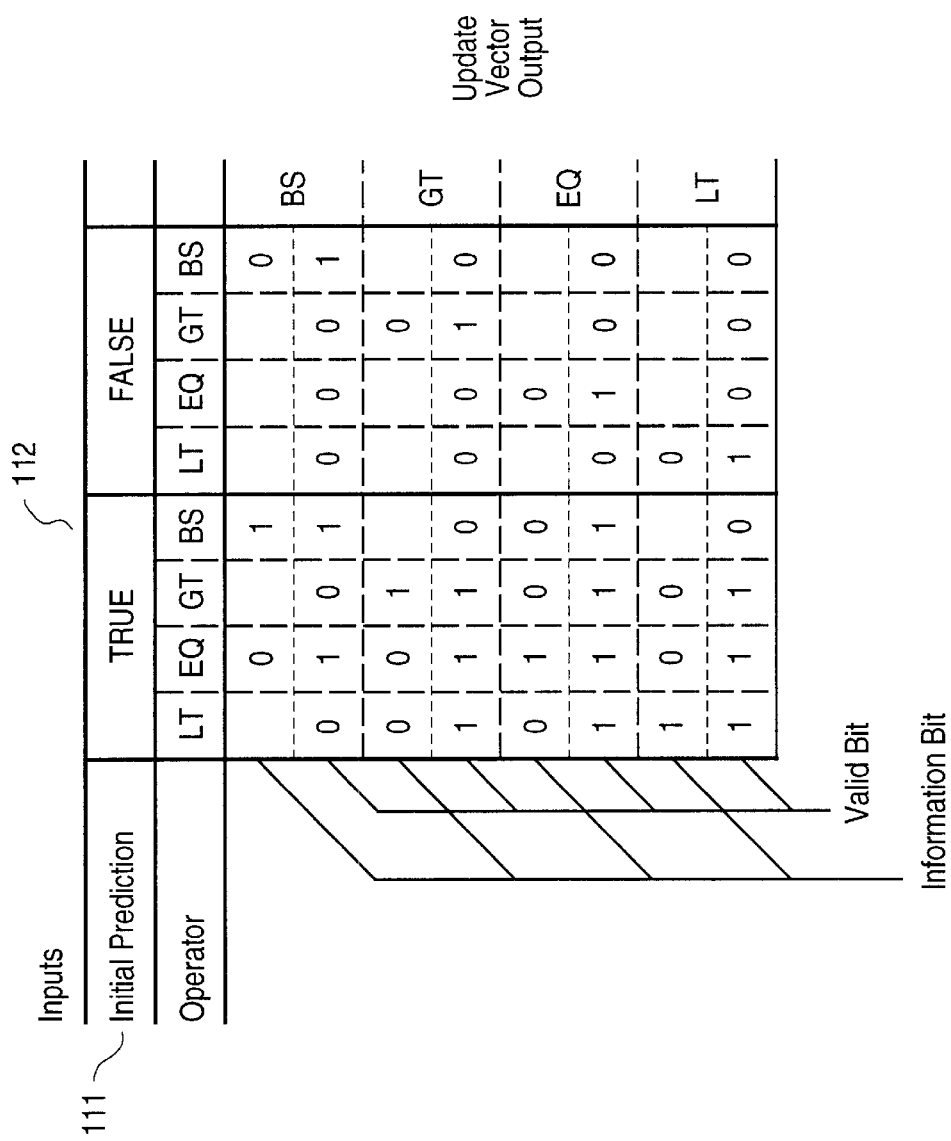
FIG. 8 is a table of the partial contents of the deduction circuit of the guard outcome predictor.

Deduction Circuit 112 deduces additional consistent guard outcome predictions in response to the initial prediction on line 111 and the guard operator identified by the Operator ID signal on lines 166. Deduction Circuit 112 presents its deductions as a data and valid bit for each guard operator. Deduction Circuit 112 is preferably realized as a ROM organized as a table or a Programmable Logic Array (PLA). FIG. 8 illustrates the contents of Deduction Circuit 112 given a set of guard operators including: BS, GT, EQ, and LT. For example, given an initial prediction of TRUE for LT, Deduction Circuit 112 outputs signals indicating that for the EQ operator the data bit should be cleared and the valid bit set. Deduction Circuit 112 can easily be modified to store deduction values for the guard operators: BC, NGT, NEQ and NLT.

Alternatively, Deduction Circuit 112 may be modified to consider previously predicted guard outcomes for a guard source when deducing guard outcome predictions consistent with the initial prediction.

Write Back Circuitry 114 selects the deduced guard outcome predictions to write back into Condition Consistency Cache 100 on a guard operator by guard operator basis, allowing only those guard outcome deductions deemed to be valid to be written back. Write Back Circuitry 114 includes an instance of a Write Back Circuit 114a for each guard operator of the set of guard operators. Write Back Circuit 114a includes a multiplexor (MUX) 210 and a Logical OR 212. The two inputs to MUX 210 are a data bit read from Condition Consistency Cache 100 and a data bit received from Deduction Circuit 114. The associated valid bit from Deduction Circuit 114 selects between the two MUX inputs, selecting the deduced data bit when the deduction is valid. Logical OR 212 determines the state of the valid bit to be written back to Condition Consistency Cache 100. Logical OR 212 indicates that the data bit is valid in response to assertion of either the valid bit from Deduction Circuit 114 or the valid bit from Condition Consistency Cache 100.

E. A Second Guard Outcome Predictor Embodiment

Figure 9:
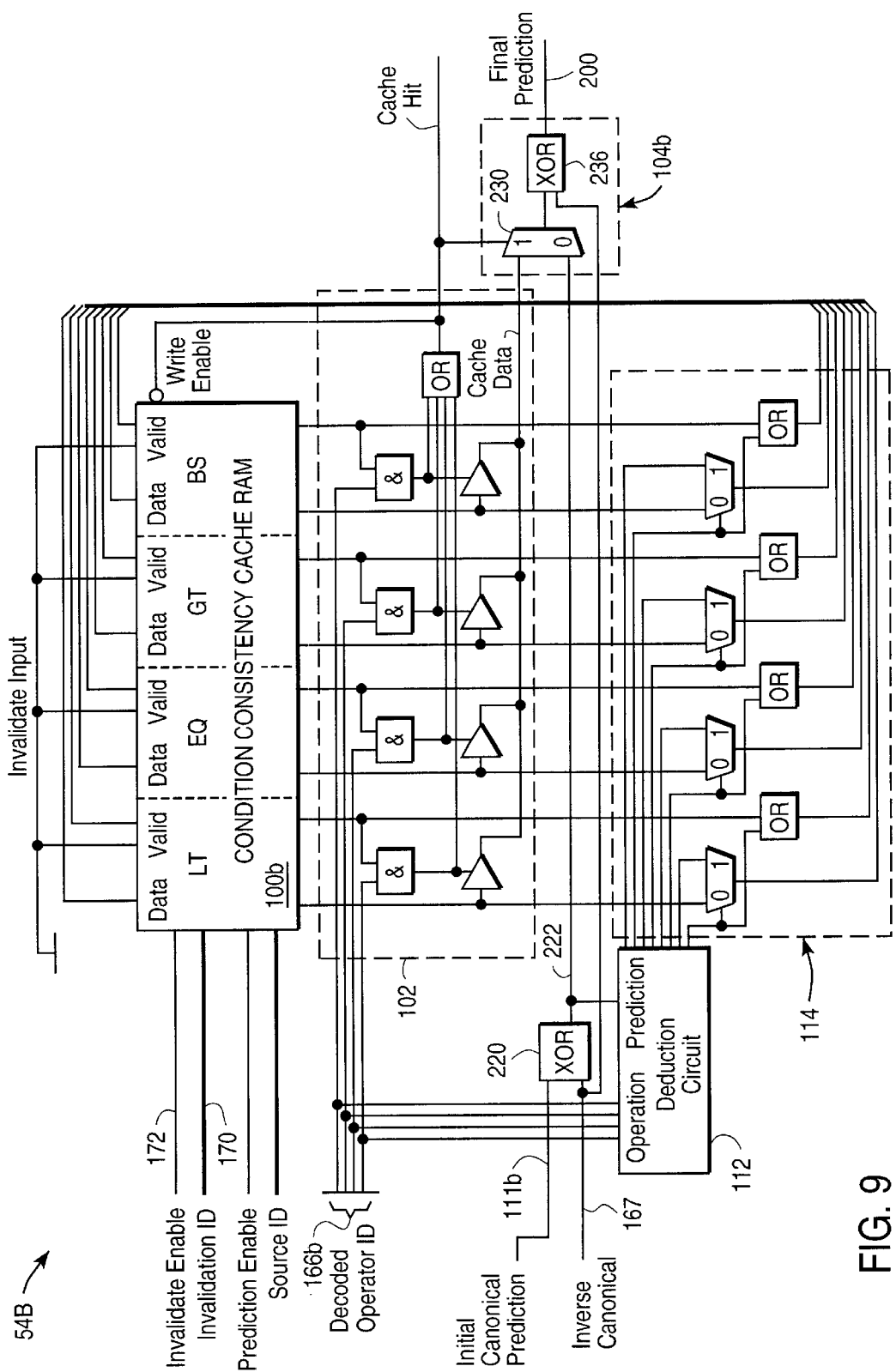
FIG. 9 is a detailed block diagram of a second embodiment of a guard outcome predictor.

FIG. 9 illustrates a second embodiment 54B of Guard Outcome Predictor 54 based upon a compact, or canonical, representation of a set of guard operators. Stated another way, in this embodiment consistent guard outcome predictions for a set of guard operators are made by storing guard outcome predictions for a subset of the guard operators. For example, guard outcomes for a set of guard operators including: LT, NLT, EQ, NEQ, GT, NGT, BS and BC can be determined by storing information for just the canonical operators: LT, EQ, GT and BS. This is because each of the canonical operators has an associated inverse canonical operator, for which a guard outcome prediction can be found by taking the inverse of the guard outcome prediction for the associated canonical operator. For example, given a guard outcome prediction of TRUE for the canonical operator LT, for its inverse canonical operator NLT the consistent guard outcome prediction is FALSE.

Minor modification to Guard Operation Decoder 56 is necessary to accommodate canonical representation of guard operators. After identifying the selected guard operator, Guard Operation Decoder 56 represents the guard operator by a set of signals, the Operator ID signal on lines 166 and the Inverse Canonical signal on line 167. The Operator ID signal identifies one of the canonical operators, LT, EQ, GT or BS, while the Inverse Canonical signal indicates whether the identified operator is the canonical operator or its inverse.

A number of relatively minor modifications to the Guard Outcome Predictor 54 enable it to support canonical representation of guard operators. Thus, unless otherwise stated, Guard Outcome Predictor 54B of FIG. 9 functions identically to Guard Outcome Predictor 54A. Circuits modified to support canonical representation of guard operators include Condition Consistency Cache 100b, Selection Circuit 104b and Guard Operation Decoder 56. Additionally, Guard Outcome Predictor 54B includes Logical XOR 220 and XOR 236.

Condition Consistency Cache 100b differs from its first embodiment 100a in that less memory capacity is required to represent the same number of guard source entries for the same set of guard operators. For example, Condition Consistency Cache 100a stores 16 bits per guard source entry to represent guard outcome predictions for a set of eight guard operators, while Condition Consistency Cache 100b stores 8 bits per guard source entry to represent guard outcome predictions for a set of eight guard operators.

Logical XOR 220 determines the value of initial prediction to be coupled to Selection Circuit 104b on line 222. Logical XOR 220 makes its determination based upon the value of the Initial Canonical Prediction signal on line 111b and the Inverse Canonical signal on line 167. For example, if the guard operator is a canonical operator, the Inverse Canonical signal will be a logic low, allowing the Initial Prediction signal to pass unmodified through Logical XOR 220. On the other hand, if the guard operator is an inverse canonical operator, then Logical XOR 220 inverts the Initial Prediction Signal prior to driving the Initial Prediction signal onto line 222. If the Initial Canonical Prediction is TRUE and the Inverse Canonical signal is asserted, then Logical XOR 220 will force the Initial Prediction signal to represent FALSE. On the other hand, if the Initial Canonical Prediction is FALSE and the Inverse Canonical signal is asserted, then Logical XOR forces the Initial Prediction Circuit to represent TRUE.

Modifications to Selection Circuit 104 account for the fact that Condition Consistency Cache 100b stores guard outcome predictions just for the canonical operators while guard outcome predictions are required for inverse canonical operations also. Selection Circuit 104b includes a Logical MUX 230 to select between cache data, representing a canonical guard outcome prediction, and the Initial Prediction. The output from Logical MUX 230 is coupled to Logical XOR 236, which generates the inverse canonical guard outcome prediction, when required. For example, assume that there is a cache hit, that the cache data is TRUE and a guard outcome prediction for the inverse canonical operation is desired, which should be FALSE. Under these conditions, a high logic level would be input to Logical XOR 236 to represent the TRUE retrieved from Condition Consistency Cache 100b. The other input to Logical XOR 236, the Inverse Canonical signal on line 167, would be a logic high, forcing Logical XOR 236 to output a logic low, representative of FALSE, as the final prediction on line 200. Selection Circuit 104b functions equally well when the cache data represents FALSE and the guard outcome prediction for the inverse canonical operator is desired, which should be TRUE. Data retrieved from Condition Consistency Cache 100b, FALSE, is coupled to one input of Logical XOR 236 and the Inverse Canonical signal is asserted to logic high. In response, Logical XOR 236 outputs a logic high, representative of TRUE, as the final prediction on line 200.

F. Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Guard prediction apparatus for predicting an outcome of a predicated instruction for a microprocessor, the predicated instruction specifying a guard condition and an operation to be performed when the guard condition has a value of true, the guard prediction apparatus comprising:

a) an initial prediction circuit that generates an initial prediction of the value of the guard condition;

b) a cache of previous predictions of values of guard conditions;

c) availability logic coupled to the cache to generate a select signal to indicate whether the cache includes a previous prediction indicative of the value of the guard condition;

d) a selection circuit for selecting as a final prediction of the value of the guard condition one of the previous prediction and the initial prediction in response to the select signal; and e) a circuit that enables execution of the operation when the final prediction has the value of true and disables execution of the operation when the final prediction has a value of false.

2. The guard prediction apparatus of claim 1, wherein the cache includes a register for storing a valid bit and a data bit for the guard condition.

3. The guard prediction apparatus of claim 2 wherein the cache includes:

invalidation means for setting the valid bit to a value representing invalidity in response to an invalidate signal.

4. The guard prediction apparatus of claim 1 further comprising:

f) write back circuitry for writing the initial prediction into the cache when the selection signal selects the initial prediction as the final prediction.

5. The guard prediction apparatus of claim 1, wherein the guard condition comprises a guard source, a guard operator, and the value such that the value of the guard condition is a result of applying said guard operator to said guard source, said guard operator being one of a set of guard operators; and the cache includes a register for the guard source, said register storing a plurality of data bit and valid bit pairs, each data bit and valid bit pair corresponding to at least one guard operator in the set of guard operators.

6. The guard prediction apparatus of claim 5 further comprising:

f) a deduction circuit for deducing values for the set of guard operators that are consistent with the initial prediction; and g) write back circuitry for writing the values for the set of guard operators and the initial prediction into the cache.

7. The guard prediction apparatus of claim 6 wherein the write back circuitry also writes back the previous predictions into the cache.

8. The guard prediction apparatus of claim 5 wherein the cache includes:

invalidation means for setting each valid bit of the register associated with the guard; source to a value representative of invalidity when the guard source is modified.

9. The guard prediction apparatus of claim 1, wherein the circuit enables execution of the operation by creating a first non-predicated instruction including said operation when the final prediction has the value of true, said first non-predicated instruction being executed instead of the predicated instruction.

10. The guard prediction apparatus of claim 9, wherein the circuit creates a second non-predicated instruction, said second non-predicated configured to determine whether the guard condition has the value of true, said second non-predicated instruction being executed in addition to the first non-predicated instruction.

11. The guard prediction apparatus of claim 1, wherein the circuit disables execution of the operation by creating a first non-predicated instruction including a no-operation when the final prediction has the value of false, said first non-predicated instruction being executed instead of the predicated instruction.

12. The guard prediction apparatus of claim 11, wherein the circuit creates a second non-predicated instruction, said second non-predicated configured to determine whether the guard condition has the value of false, said second non-predicated instruction being executed in addition to the first non-predicated instruction.

13. Guard prediction apparatus for predicting an outcome of a predicated instruction for a microprocessor, the predicated instruction specifying a guard source and a guard operator, said guard operator being applied to the guard source to produce a guard outcome, the guard operator being one of a set of guard operators, the predicated instruction also specifying an instruction to be performed when the guard outcome has a value of true, the guard prediction apparatus comprising:
   a) an initial prediction circuit that generates an initial prediction of the guard outcome;
   b) a cache of previous predictions of guard outcomes;
   c) availability logic coupled to the cache that generates a select signal to indicate whether the cache includes a previous prediction relevant to the guard outcome;
   d) a selection circuit for selecting as a final prediction of the guard outcome one of the previous prediction and the initial prediction in response to the select signal;
   e) a deduction circuit for deducing, from the initial prediction, consistent guard outcomes for the set of guard operators when applied to the guard source; and
   f) write back circuitry for writing the consistent guard outcomes into the cache.

14. The guard prediction apparatus of claim 13, wherein the cache includes a register for storing a valid bit and a data bit for the guard source.

15. The guard prediction apparatus of claim 13, wherein
   the cache includes a register for the guard source, the register storing a plurality of data bit and valid bit pairs, each pair corresponding to at least one of the guard operators in the set of guard operators.

16. The guard prediction apparatus of claim 15, wherein the cache stores previous predictions for a subset of the set of guard operators.

17. The guard prediction apparatus of claim 13, wherein the write back circuitry also writes back the previous predictions into the cache.

18. A method of making consistent guard outcome predictions for a first predicated instruction and a second predicated instruction, the first predicated instruction specifying a first guard operator to be applied to a first guard source to produce a first guard outcome, the second predicated instruction specifying a second guard operator to be applied to the first guard source to produce the second guard outcome, the first guard operator and the second guard operator being one of a set of guard operators, the method comprising:
   a) making a first initial prediction of the first guard outcome;
   b) deducing from the first initial prediction a first set of consistent guard outcomes for a first subset of the set of guard operators when applied to the first guard source;
   c) writing the first set of consistent guard outcomes into a cache;
   d) in response to receipt of the second predicated instruction:
      1) searching the cache for a guard outcome associated with the first guard source and the second guard operator;
      2) when the cache search is successful, generating a final prediction of the second guard outcome that is based upon the guard outcome associated with the first guard source and the second guard operator.

19. The method of claim 18 wherein step d) further comprises:
   3) making a second initial prediction for the second guard outcome;
   4) when the cache search is not successful, generating the final prediction of the second guard outcome that is based upon the second initial prediction;
   5) deducing from the second initial prediction a second set of consistent guard outcomes for a second subset of the set of guard operators when applied to the first guard source; and
   6) writing the first set of consistent guard outcomes and the second set of consistent guard outcomes into the cache.

20. Guard prediction apparatus for processing a predicated instruction in a microprocessor, the predicated instruction specifying a guard source, a guard operator, and a guarded operation to be performed when a guard outcome has a value of true, said guard outcome being a result of applying said guard operator to said guard source, the guard prediction apparatus comprising:
   prediction logic to generate a prediction of the guard outcome;
   instruction generation logic to generate a first non-predicated instruction and a second non-predicated instruction for execution instead of the predicated instruction by reference to the predicated instruction and the prediction, wherein
      the first non-predicated instruction includes the guarded operation when the prediction has the value of true;
      the first non-predicated instruction includes a no-operation when the prediction has a value of false;
      the second non-predicated instruction verifies the prediction; and
      execution of the first non-predicated instruction and execution of the second non-predicated instruction are independent such that the first non-predicated instruction and the second non-predicated instruction are executed in one of two orders including the first non-predicated instruction before the second non-predicated instruction and the first non-predicated instruction after the second non-predicated instruction.

21. The guard prediction apparatus of claim 20, wherein the prediction logic comprises
   an initial prediction circuit that generates an initial prediction of the guard outcome;
   a cache configured to store previous predictions of guard outcomes;
   availability logic coupled to the cache to generate a select signal to indicate whether the cache includes a previous prediction indicative of the guard outcome; and
   a selection circuit for selecting as the prediction one of the previous prediction and the initial prediction in response to the select signal.

22. The guard prediction apparatus of claim 21, wherein the cache includes a register for storing a valid bit and a data bit for the guard outcome.

23. The guard prediction apparatus of claim 22, wherein the cache includes:

invalidation means for setting the valid bit to a value representing invalidity in response to an invalidate signal.

24. The guard prediction apparatus of claim 21 further comprising:

write back circuitry for writing the initial prediction into the cache when the selection signal selects the initial prediction as the prediction.

25. The guard prediction apparatus of claim 21, wherein the guard operator is one of a set of guard operators; and the cache includes a register for the guard source, said register storing a plurality of data bit and valid bit pairs, each data bit and valid bit pair corresponding to at least one guard operator in the set of guard operators.

26. The guard prediction apparatus of claim 25 further comprising:

a deduction circuit for deducing values for the set of guard operators that are consistent with the initial prediction for the guard condition; and write back circuitry for writing the values for the set of guard operators and the initial prediction into the cache.

27. The guard prediction apparatus of claim 26, wherein the write back circuitry also writes back the previous predictions into the cache.

28. The guard prediction apparatus of claim 25, wherein the cache includes:

invalidation means for setting each valid bit of the register associated with the guard source to a value representative of invalidity when the guard source is modified.

* * * * *